(12) United States Patent
Kocurek

(10) Patent No.: US 9,835,252 B2
(45) Date of Patent: Dec. 5, 2017

(54) MULTI-ELASTOMER SEAL

(75) Inventor: Christopher George Kocurek, Houston, TX (US)

(73) Assignee: ONESUBSEA IP UK LIMITED, London (GB)

( * ) Notice: Subject to any disclaimer, the term of this patent is extended or adjusted under 35 U.S.C. 154(b) by 116 days.

(21) Appl. No.: 13/493,984

(22) Filed: Jun. 11, 2012

(65) Prior Publication Data

US 2012/0248703 A1 Oct. 4, 2012

Related U.S. Application Data

(63) Continuation of application No. 12/669,037, filed as application No. PCT/US2008/075620 on Sep. 8, 2008, now Pat. No. 8,201,832.

(60) Provisional application No. 60/972,049, filed on Sep. 13, 2007.

(51) Int. Cl.
   *F16J 15/12* (2006.01)
   *E21B 33/03* (2006.01)
   *F16J 15/10* (2006.01)

(52) U.S. Cl.
   CPC ............ *F16J 15/121* (2013.01); *E21B 33/03* (2013.01); *F16J 15/104* (2013.01)

(58) Field of Classification Search
   USPC ....... 277/607, 616, 626–627, 630, 637, 644, 277/650
   See application file for complete search history.

(56) References Cited

U.S. PATENT DOCUMENTS

| | | |
|---|---|---|
| 266,848 A | 10/1882 | Lewis |
| 2,136,674 A | 11/1938 | Packer |
| 2,173,903 A | 9/1939 | Halliburton |
| 2,182,251 A | 12/1939 | Crickmer et al. |
| 2,196,668 A | 4/1940 | Ragan |
| 2,255,451 A | 9/1941 | Otis |
| 2,524,225 A | 10/1950 | Hanchett, Jr. |
| 2,612,953 A | 10/1952 | Morgan et al. |
| 2,906,344 A | 9/1959 | Clark, Jr. |
| 2,988,148 A | 6/1961 | Conrad et al. |
| 3,036,639 A | 5/1962 | Baker |
| 3,229,767 A | 1/1966 | Carter |
| 3,284,089 A | 11/1966 | Wrenshall |
| 3,358,766 A | 12/1967 | Current |

(Continued)

FOREIGN PATENT DOCUMENTS

| | | |
|---|---|---|
| GB | 638652 | 6/1950 |
| WO | 94/05935 A1 | 3/1994 |

OTHER PUBLICATIONS

Akisanya et al.; "The Deformation of a Dual-Elastomer Seal"; Engineering Department, University of Aberdeen, Scotland, UK; Proceedings of the Institution of Mechanical Engineers; vol. 215, Part I; pp. 29-40; 2001.

(Continued)

*Primary Examiner* — Vishal A Patel
(74) *Attorney, Agent, or Firm* — Fletcher Yoder, P.C.

(57) ABSTRACT

A system, in certain embodiments has, a fluid seal having a seal body, including a seal interface having one or more engagement portions, a first elastomer portion disposed along the seal interface, and a second elastomer portion disposed along the seal interface, wherein the first and second elastomers have material properties that are different from one another.

25 Claims, 9 Drawing Sheets

(56) References Cited

U.S. PATENT DOCUMENTS

| | | |
|---|---|---|
| 3,387,659 A | 6/1968 | Current |
| 3,554,280 A | 1/1971 | Tucker |
| 3,666,010 A | 5/1972 | Harris |
| 3,784,214 A | 1/1974 | Tamplen |
| 3,907,307 A | 9/1975 | Maurer et al. |
| 4,050,701 A | 9/1977 | Webb |
| 4,140,323 A | 2/1979 | Jacobs |
| 4,169,605 A | 10/1979 | Nishimoto et al. |
| 4,194,795 A | 3/1980 | Rife |
| 4,219,204 A | 8/1980 | Pippert |
| 4,234,197 A | 11/1980 | Amancharla |
| 4,307,781 A | 12/1981 | Preston, Jr. et al. |
| 4,326,588 A | 4/1982 | McStravick |
| 4,381,114 A | 4/1983 | Vanderford, Jr. |
| 4,493,373 A | 1/1985 | Jackson |
| 4,496,161 A | 1/1985 | Risher |
| 4,496,162 A | 1/1985 | McEver et al. |
| 4,538,380 A | 9/1985 | Colliander |
| 4,596,395 A * | 6/1986 | Miser ............... F16J 15/24 277/562 |
| 4,709,761 A | 12/1987 | Setterberg, Jr. |
| 4,714,111 A | 12/1987 | Brammer |
| 4,815,770 A | 3/1989 | Hyne et al. |
| 5,014,603 A | 5/1991 | Navarette |
| 5,165,703 A | 11/1992 | Morvant |
| 5,176,666 A * | 1/1993 | Conway et al. ............ 604/349 |
| 5,180,008 A | 1/1993 | Aldridge et al. |
| 5,193,616 A | 3/1993 | Hynes |
| 5,362,073 A | 11/1994 | Upton et al. |
| 5,584,488 A * | 12/1996 | Lembcke ............ E21B 17/06 277/314 |
| 5,738,358 A | 4/1998 | Kalsi et al. |
| 5,791,657 A | 8/1998 | Cain et al. |
| 5,941,286 A * | 8/1999 | Fauble et al. .................. 138/137 |
| 6,079,465 A * | 6/2000 | Takeyama et al. ............ 152/510 |
| 6,302,405 B1 | 10/2001 | Edwards |
| 6,557,857 B1 | 5/2003 | Goodman |
| 6,565,093 B2 * | 5/2003 | Crow ................. E21B 33/1208 277/337 |
| 6,755,422 B2 * | 6/2004 | Potter ............................. 277/652 |
| 7,168,147 B2 | 1/2007 | Smith et al. |
| 7,407,165 B1 * | 8/2008 | Chisnell ......................... 277/603 |
| 7,464,968 B2 | 12/2008 | Sakazaki |
| 7,469,905 B2 * | 12/2008 | Knapp ........................... 277/608 |
| 7,740,248 B2 * | 6/2010 | Keene et al. ................ 277/603 |
| 2003/0209857 A1 | 11/2003 | Keene |
| 2004/0157035 A1 | 8/2004 | Guizzetti |
| 2005/0062235 A1 | 3/2005 | Keene et al. |
| 2005/0285353 A1 | 12/2005 | Rueger |
| 2007/0170660 A1 | 7/2007 | Burgess |
| 2010/0117307 A1 | 5/2010 | Rueger |

OTHER PUBLICATIONS

Bauer, Brockelmann, Ebertshäuser, Gatti, Gonschior, Krumeich, Metzner, Reuter, Wernecke: "Dichtungen für die Fluidtechnik"; 1993, Vereinigte Fachverlage, Mainz, XP002507429 ISBN: 3-7830-0276-1; pp. 155-162; figures 1.7.22f,g figure 1.7.26c.

PCT International Search Report and Written Opinion for PCT/US2008/075620, dated Dec. 29, 2008.

EP Examination Report on Application No. EP08831055.2, dated Jul. 3, 2012.

EP Notice of Summons to Attend Oral Proceedings Pursuant to Rule 115(1) EPC; Application No. EP 08831055.2; dated Dec. 8, 2016; 8 pages.

* cited by examiner

MULTI-ELASTOMER SEAL

CROSS-REFERENCE TO RELATED APPLICATIONS

This application claims priority to and benefit of U.S. application Ser. No. 12/669,037, entitled "Multi-Elastomer Seal," filed Jan. 13, 2010, which is herein incorporated by reference in its entirety, which claims priority to and benefit of PCT Patent Application No. PCT/US2008/075620, entitled "Multi-Elastomer Seal," filed Sep. 8, 2008, which is herein incorporated by reference in its entirety, and which claims priority to and benefit of U.S. Provisional Patent Application No. 60/972,049, entitled "Multi-Elastomer Seal", filed on Sep. 13, 2007, which is herein incorporated by reference in its entirety.

FIELD OF THE INVENTION

This invention relates to seals within a fluid system. More particularly, the present invention relates to an elastomeric seal suitable for use in the harsh environment, temperatures, and pressures of mineral extraction systems, for example.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fluid systems, such as mineral extraction systems (e.g. oil and gas) and transport systems, typically include multiple segments of tubing, valves, and connectors that are sealed together by various seals. These seals are often subjected to harsh environmental conditions, such as corrosive fluids, extreme pressures, and extreme temperatures. Moreover, seals are often disposed in remote equipment, such as a marine (e.g., subsea) wellhead, which can make access and repair difficult and expensive. In mineral extraction applications, seals are typically constructed of a metal or an elastomer. Metal seals provide long-term resistance to well bore fluids, temperatures and pressures, but often rely on high installation forces and complicated design and geometry to provide reliable sealing. Elastomeric seals typically have a simple design that can be installed with low installation forces. Further, elastomeric seals may provide a seal across imperfections (e.g., damage, concentricity and ovalities) on sealing surfaces, and have larger manufacturing tolerances, concentricity and ovalities allowances. Elastomeric seals are generally formed from a single elastomer that is designed for use in a particular environment. For example, an electrometric seal including specific material may be employed based on the seal's anticipated operating temperature, pressure and chemical exposure. Accordingly, the electrometric seal is often limited to use in a given range of pressures, temperatures, surrounding chemicals.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
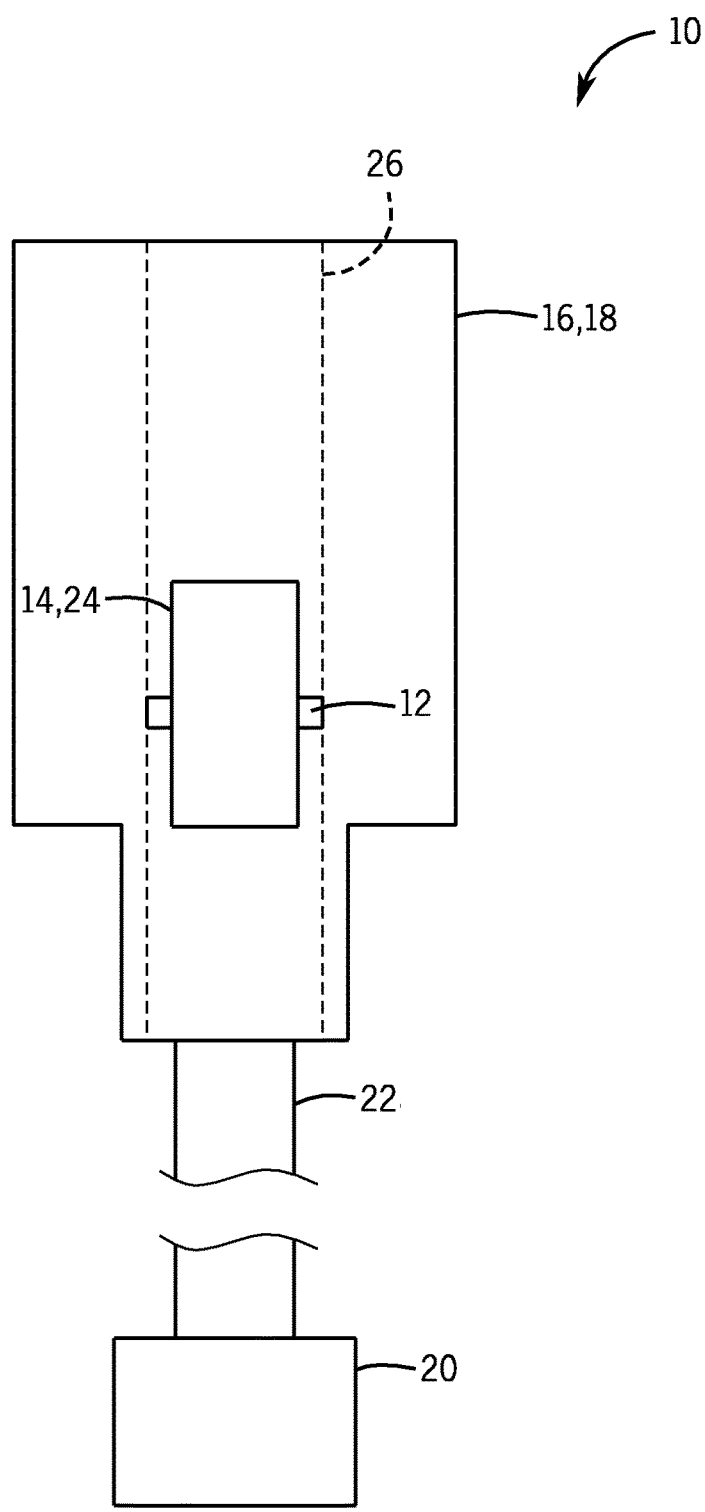
FIG. 1 is a block diagram of a multi-elastomer seal disposed in a fluid system, in accordance with embodiments of the present technique.

FIG. 1 is a partial cross-sectional view of an embodiment of a fluid system 10 having one or more seals 12 between an inner body 14 and an outer body 16. In certain embodiments, the fluid system 10 includes a mineral extraction system for the extraction of subterranean natural resources, such as oil and gas. For example, in the illustrated embodiment, the outer body 16 includes a wellhead 18 coupled to a mineral deposit 20 via a well 22. The inner body 14 includes a hanger 24 disposed in a wellhead bore 26 and supported by the wellhead 18, for example. It will be appreciated that in the case of mineral extraction systems, the inner and outer bodies 14 and 16 may include any number of components, such as christmas trees, casing hangers, casing heads, casing strings, tubing hangers, tubing heads, tubing strings, running tools, blowout preventers, valves, flanges, and the like. In mineral extraction and similar systems, the seal 12 may be used with working pressures including 20,000 pounds per square inch (psi). In other words, in certain embodiments, the seal 12 may be used to isolate regions of gasses or fluids with pressure differentials across the seal 12 of 15,000 psi or greater. Further, the operating environment of such systems may include temperatures ranging from −50° F. to 350° F.

As discussed in further detail below, embodiments of the seal 12 generally include a plurality of elastomers. For example, the seal 12 may include different portions made of different elastomers having different characteristics, such as stiffness, chemical resistance, behavior as a function of temperature, and so forth. In some embodiments, the plurality of elastomers may be formed into a single body. The illustrated seal 12 includes a combination of an outer elastomer and an inner elastomer formed into a homogeneous body (e.g., single common/solid body). In certain embodiments, the outer elastomer includes a hard material, and the internal elastomer includes a relatively soft material, or vice-versa. The hard outer elastomer possesses properties that are conducive to sealing in high-pressure and high-temperature environments, and the inner elastomer possesses properties that are conducive to sealing in high-pressure and low-temperature environments. Accordingly, in certain embodiments, the outer elastomer is used for sealing, protecting, and isolating the inner elastomer from high-pressure media in high-temperature environments, and the inner elastomer is used for sealing at high temperatures and/or when the environmental temperatures are below effective sealing temperatures of the outer elastomer. In other words, the seal 12 includes a first material or property that is effective to seal mutually exclusively without the second material or property in certain conditions, while the second material or property is effective to seal mutually exclusively without the first material or property in other conditions. Thus, the embodiments of the seal 12 described in detail below are particularly well suited for use in a wide range of temperatures (e.g., high and low temperatures) and chemical environments.

Figure 2:
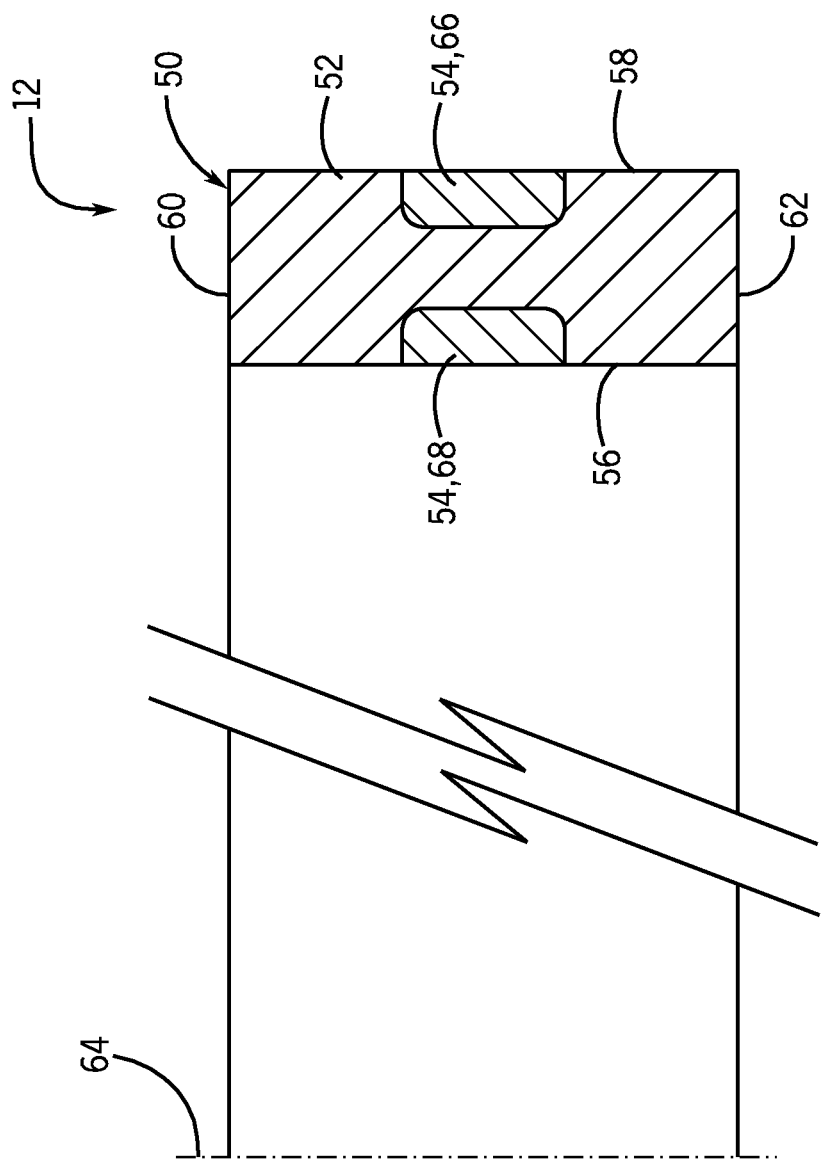
FIG. 2 is a partial cross-section of an exemplary embodiment of the multi-elastomer seal of FIG. 1.

FIG. 2 illustrates a cross-sectional view of an exemplary embodiment of the seal 12. The illustrated embodiment includes the annular seal 12 having a body 50, a first elastomer portion 52, a second elastomer portion 54, an inner face 56, an outer face 58, a top face 60, a bottom face 62, and a longitudinal axis 64. As will be appreciated, the body 50 of the annular (e.g., radial) seal 12 includes a ring-like member centered about the longitudinal axis 64. The inner face 56 includes the innermost diameter of the body 50 that generally interfaces with (e.g., contacts) the inner body 14. The outer face 58 includes the face of the seal 12 on the outermost diameter of the body 50 that generally interfaces with (e.g., contacts) the outer body 16. Accordingly, the inner face 56 and the outer face 58 provide a fluid seal between the annular seal 12 and the inner body 14 and the outer body 16, respectively.

In an annular seal configuration, the seal 12 is generally set by a radial load that compresses or expands the seal into contact with complementary sealing surfaces (e.g., inner and outer bodies 14 and 16). For example, the inner body 14 may include a section with a smaller diameter, a section with a larger diameter, and a tapered section between the two sections. Thus, urging the seal 12 onto the inner body 14 and over the tapered section from the small diameter section to the large diameter section provides an axial loading that biases the seal 12 outward and compresses the seal 12 against the outer body 16. Similarly, a taper on the outer body 16 may provide a compressive load on a seal 12 to generate an inward radial loading that compresses the seal 12 against the inner body 14. In general, the top face 60 and the bottom face 62 generally do not seal with a complementary surface. However, in a packer arrangement, the top face 60 and the bottom face 62 may generally be used as locations to apply loads to seat, set, and/or lock the seal 12 in place. In other words, the top and bottom faces 60 and 62 may experience axial loads to push the seal 12 into position, to compress the seal 12 such that it expands radially between the inner body 14 and the outer body 16, and to hold the seal 12 in place. For example, a tool may be forced against the top face 60 until the bottom face 62 contacts a surface and/or another tool, and to load the top face 60 in a direction parallel to the longitudinal axis 64 to compress the seal 12, causing the seal 12 to expand radially. The radial expansion may cause the outer and inner faces 56 and 58 to bias against the outer body 16 and the inner body 14, creating a fluid seal between the respective interfaces. Continuing to apply the axial force (e.g., locking the seal 12) may maintain the radial expansion and, thus, maintain the fluid seal.

The portion of the seal 12 (e.g., the seal interface) that engages the complementary surfaces (e.g., the inner body 14 and the outer body 16) may be may include a variety of shapes and configurations. For example, the seal interface may include a continuous surface that is formed from one or more materials. In an embodiment wherein the complementary sealing surface generally conforms to the contour of the seal 12 (e.g., a relatively flat surface), the sealing interface may include a single engagement portion that extends across a surface of the seal 12. In an embodiment where the complementary surface includes a surface that does not conform to a surface of the seal 12 (e.g., an interrupted surface), the seal interface may include one or more engagement portions at each location where the seal 12 contacts the complementary surface. Further, the seal 12 may include a plurality of interruptions along its sealing surface. For example, the seal 12 may include one ore more bumps, protrusions, indentations, recesses, or similar features. Accordingly, where the complementary surface does not conform to the contour of the seal 12, the seal interface may include one or more engagement portions at each of the location where the seal 12 contacts the complementary surface. Further, each of the seal engagement portions may include the same or even different types of materials depending on the composition and arrangement of the materials used to form the seal 12.

In the illustrated embodiment, the seal 12 includes the body 50 having the first elastomer portion 52 flanking the second elastomer portion 54. The body 50 includes the first elastomer portion 52 having a generally rectangular shape (e.g., cross-sectional profile) and the nested second elastomer portion 54. In one embodiment, nested refers to a set of items or parts forming a hierarchical structure with larger parts (e.g., the first elastomer portion 52) enclosing smaller ones (e.g., the second elastomer portion 54). The second elastomer portion 54 includes an outer second elastomer 66 adjacent (e.g., sharing a boundary with) the outer face 58 and an inner second elastomer 68 adjacent the inner face 56. Accordingly, each of the outer soft elastomer 66 and the inner soft elastomer 68 include a band of material that is disposed in the outer and inner diameter of the first elastomer portion 52. In other words, the first elastomer portion 52 includes an "I" shaped cross-section with the second elastomer portion 54 embedded into the outer face 58 and the inner face 56 of the body 50.

As will be appreciated, the shape of the first elastomer portion 52 and the second elastomer portion 54 may be varied to accommodate specific applications. For example, the first elastomer portion 52, in one embodiment, includes a shape (e.g., cross-sectional profile) that includes chamfers or other features conducive to seating, setting and locking the seal 12. Another embodiment includes only one of the second elastomer portions 54. For example, an embodiment includes only the outer soft elastomer 66, and another embodiment includes only the second soft elastomer 68. Further, the shape and location of each of the first and second sealing portions 52 and 54 may be varied. For instance, the second elastomer portions 54 may not be disposed symmetrically about the body 50. In one embodiment, the outer soft elastomer 66 is offset from the inner soft elastomer 68 in a direction generally parallel to the longitudinal axis 64. Further, the size and shape of each of the outer soft elastomer 66 and the inner soft elastomer 68 may be varied. For example, in one embodiment, the height and/or width of the outer portion 66 is less than or greater than the height and/or width of the inner portion 68. Similarly, an embodiment may include varying the shapes of the soft elastomer portions 54. For example, in one embodiment, the outer soft elastomer 66 includes a generally rectangular shape (e.g., a profile similar to those depicted) and the inner soft elastomer 68 has a semi-circular shape, or vice-versa. Further, embodiments include the first elastomer portion 52 and/or the second elastomer portion 54 including indentations and protrusions (e.g., bumps) that extend radially from the faces 56 and 58 the seal 12. Embodiments including the varied cross-sectional geometry of the seal 12 are discussed in further detail below with regard to FIGS. 4-23.

The first elastomer portion 52 and the second elastomer portion 54 include different materials that work cooperatively to provide the desired fluid seal in a range of environments. In one embodiment, the seal 12 includes a first elastomer portion 52 formed from a hard elastomer that is resistant to corrosive attacks and conducive to use in high-temperature environments, and includes a second elastomer portion 54 conducive to sealing in low-temperature environments. Thus, the seal 12 may effectively seal over a broader range of temperatures and pressures as compared to a single elastomer seal. For example, at high temperatures, the hard first elastomer portion 52 is conducive to sealing between the inner and outer faces 56 and 58 of the seal 12, and the inner and outer bodies 14 and 16, respectively. Accordingly, in embodiments including the first elastomer portion 52 flanking (e.g., surrounding) the second elastomer portion 54, as discussed with regard to FIG. 2, the first elastomer portion 52 effectively prevents corrosive fluids and/or high temperature and pressure fluids from engaging the second elastomer portion 54. At low temperatures (e.g., those below the effective sealing temperature of the first elastomer portion 52), the softer second elastomer portion 54 maintains the desired fluid seal between the inner and outer faces 56 and 58 of the seal 12, and the inner and outer bodies 14 and 16, respectively. For example, at low temperatures, the harder first elastomer portion 52 may not provide an effective fluid seal and, thus, expose the softer second elastomer portion 54 to the environment, including the sealing temperatures, pressure and corrosive chemicals proximate to the seal 12. However, at reduced temperatures, the softer elastomer maintains its leathery/rubbery state and conforms to the sealing surfaces (e.g., inner body 14 and outer body 16). Further, it will be appreciated that at lower temperatures, the threat of corrosive (e.g., chemical) attack on elastomers is reduced, thus, making the soft elastomer suitable for sealing the corrosive low temperature environment. Accordingly, at low temperatures, the soft second elastomer portion 54 can provide the desired fluid seal, and the hard first elastomer portion 52 can provide the fluid seal at higher temperatures.

The combination of the harder first elastomer portion 52 and the softer second elastomer portion 54 may enable the seal 12 to maintain a fluid seal during rapid pressure fluctuations. For example, the seal 12 may be resistant to failures associated with explosive decompression. Explosive decompression (ED) refers to a sudden marked drop in the pressure of a system, associated with explosive violence. The pressure drop may occur over several minutes, and in an extreme case may occur in less than 0.1 seconds. Generally ED results from some sort of material fatigue or engineering failure, causing a contained system to suddenly vent into the external atmosphere. Seals 12 in high-pressure vessels (e.g., mineral extraction systems 10) are susceptible to explosive decompression. For example, a porous elastomer of the seals 12 can become saturated with high-pressure gases, and if the pressure inside the vessel is suddenly released, then the gases within the elastomeric seal 12 may expand violently, causing blistering or explosion of the material. Embodiments of the seal 12, including the first elastomer portion 52 flanking the second elastomer portion 54, help to prevent or reduce the effects of explosive decompression. In one embodiment, the first elastomer portion 52 effectively seals off the second elastomer portion 54 from the surrounding high pressure. In other words, the first elastomer portion 52 does not fail due to ED and, thus, protects the softer (e.g., porous) second elastomer portion 54 from the rapid drop in pressure associated with ED. The resistance from explosive decompression failure may be attributed to the lower permeability, and increased fracture resistance of the hard elastomer with respect to service media. For example, the lower permeability of the hard elastomer prevents the elastomer from becoming saturated with a significant amount of high-pressure gas. Accordingly, during ED, the first elastomer portion 52 may isolate the second elastomer portion 54 from the rapid change in pressure. Further, even if the first elastomer portion 52 fails due to ED, the second elastomer portion 54 may not have become saturated with a high-pressure gas due to the first elastomer portion 52 isolating the second elastomer portion 54 from high pressure over the period preceding ED. Thus, decompression of the surrounding environment may not be fatal to the seal 12 because there is not a significant amount gas internal to the second elastomer portion 54. In addition, the presence of the first elastomer portion 52 may slow the sequence of decompression, preventing failure of the seal 12 due to ED. In other words, if there is a failure in the first elastomer portion 52, the rate of the pressure drop experienced by the second elastomer portion 54 may be reduced due to the additional buffer provided by the first elastomer portion 52. For example, the strength, stiffness and resilience of the outer elastomer portion 52 may prevent a rapid pressure drop in the second elastomer portion 54.

The first and second elastomer portions 52 and 54 may be characterized as hard and/or soft by a variety of metrics. In one embodiment, the hardness of the elastomers may be characterized by the resistance to indentation, otherwise referred to as the materials Durometer (D) denoted in the Shore A scale. In another embodiment, the elastomers may be characterized as hard or soft based on their stiffness (e.g., glass transitions temperature). However, despite the metric, the first and second elastomer portions 52 and 54 may simply have different characteristics, properties, or responses to various conditions (e.g., temperatures, pressure, corrosive materials, etc.) in a mineral extraction system.

In a characterization including the Durometer, materials are generally characterized based on ranges. Hard elastomers generally include those having a Durometer greater than about 80 Shore A, soft elastomers generally include those having a Durometer of about 60 Shore A to about 80 Shore A, and super-soft elastomers generally include those having a Durometer below about 60 Shore A. It will be appreciated that super-soft elastomers are rarely used in oil-field and other mineral extraction systems 10; however, the inclusion of a protective first elastomer portion 52 may enable these super-soft elastomers to be included in the seal 12.

In one embodiment of the seal 12, the first elastomer portion 52 includes a hard elastomer having a Durometer of about 90 Shore A, and the second elastomer portion 54 includes a soft elastomer portion 54 having a Durometer of about 70 Shore A. For example, in one embodiment, the first elastomer portion 52 includes a hydrogenated nitrile butadiene rubber (HNBR) having a Durometer of about 90 Shore A, and the second elastomer portion 54 includes a nitrile rubber (NBR) having a Durometer of about 70 Shore A. Other embodiments may include various combinations of hard, soft and super-soft materials. For example, one embodiment includes two hard elastomers, wherein the second elastomer portion 54 has a Durometer below the Durometer of the first elastomer portion 52. Another embodiment includes a hard or soft first elastomer portion 52 and a super-soft second elastomer portion 54. As is discussed below with regard to FIGS. 4-23, the seal 12 may includes various combinations of hard, soft and super-soft elastomers. Further, an embodiment may include the first elastomer portion 52 and/or the second elastomer portion 54 formed from a CAMLAST™ or a DUROCAM™ material manufactured by Cameron with headquarters in Houston, Tex.

Figure 3:
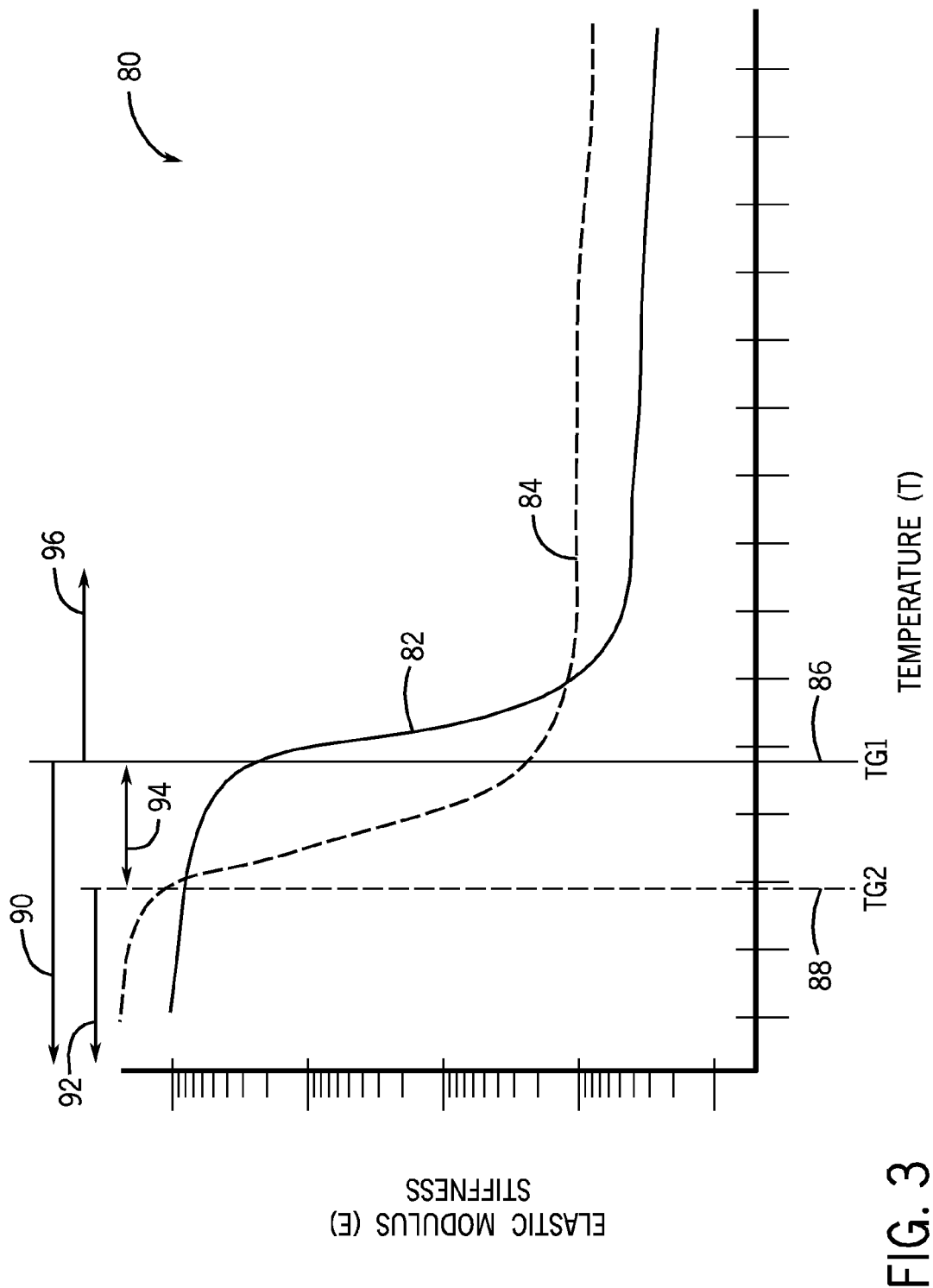
FIG. 3 is a plot of stiffness versus temperature for two elastomers used to form the multi-elastomer seal.

In a seal 12 including materials characterized by stiffness, the first elastomer portion 52 may include an elastomer having a high stiffness in a particular (e.g., operating) temperature range and the second elastomer portion 54 may include an elastomer having a relatively low stiffness in the similar temperature range. Turing now to FIG. 3, a plot 80 illustrates stiffness (e.g., elastic modulus stiffness (E)) versus temperature for two elastomers. The first curve 82 is indicative of the stiffness versus temperature plot for a relatively hard first elastomer, and the second curve 84 is indicative of the stiffness versus temperature plot for a relatively soft second elastomer. The first curve 82 indicates the first elastomer having a first glass transition temperature (TG1) 86, and the second curve 84 is indicative of the second elastomer having a second glass transition temperature (TG2) 88 that is below the first glass transition temperature (TG1) 86. The glass transition temperature is the temperature below which the physical properties of amorphous materials vary in a manner similar to those of a crystalline phase (glassy state), and above which amorphous materials behave like liquids (rubbery/leathery state). Accordingly, the first elastomer includes a glassy region 90 below the first glass transition temperature (TG1) 86 and the second elastomer includes a glassy region 92 below the second glass transition temperature (TG2) 88. Further, the plot 80 includes a region 96 that is above the glass transition temperature (e.g., TG1) of both elastomers. Thus, in the temperature region 92 both elastomers may include a glassy state. When the elastomers are in a temperature region 94, the first elastomer may include glassy state, and the second elastomer may include an amorphous (e.g., rubbery/leathery) state. Finally, in the temperature region 96, both elastomers may include an amorphous state.

The inclusion of at least a first elastomer (e.g., 82) and a second elastomer (e.g., 84) enables the seal 12 to operate effectively over a wider range of temperatures, pressures, and other environmental conditions. For example, in a seal 12 including only the first elastomer, the seal 12 may be ineffective at about or below the first glass transition temperature TG1 (86). In other words, at or below the first glass transition temperature (TG1 (86)), the first elastomer may transition to a glassy state, and seal 12 is unable to conform to the sealing surfaces (e.g., the hanger 24 and the wellhead bore 26). For instance, the first elastomer may shrink, retract, and/or embrittle due to the low temperatures, until it is unable to seal against a complementary surface. However, the inclusion of the second elastomer (e.g., 84) may provide for sealing at or below the first glass transition temperature (TG1 (86)). For example, at a temperature in the region 94 (e.g., between TG1 (86) and TG2 (88)) the first elastomer may transition into glassy state enabling fluids to pass, and the second elastomer remains in an amorphous state conducive to sealing. In other words, the inclusion of the second elastomer widens the operating temperature range of the seal 12 to include temperatures in the region 94. For example, in one embodiment, the difference between the first glass transition temperature (TG1) 86 and the second glass transition temperature (TG2) 88 is approximately 10 degrees Fahrenheit (° F.). Accordingly, the seal 12 may be rated for use in environmental conditions that are ten degrees Fahrenheit below that of a seal incorporating only the first elastomer. For example, in one embodiment the glass transition temperature of the first elastomer may be approximately 0° F. and the glass transition temperature of the second elastomer may be approximately −40° F., thus expanding the effective operating range of the seal 12 by approximately 40° F.

As will be appreciated, the potential for chemical attack on an elastomer increases as the temperature increases. Further, softer materials are generally more susceptible to chemical attack and may degrade or loose physical properties at lower temperature than relatively hard elastomers. Thus, similar to the second elastomer extending the lower operating range of the seal 12, the first elastomer extends the upper operating range of the seal 12. In other words, where the second elastomer is heated to a temperature that causes it to fail due to a chemical attack, or the elastomer transitions from a leathery/rubbery amorphous state to a degraded state, the first elastomer continues to provide an effective fluid seal. Accordingly, as discussed above, the seal 12 in certain embodiments enables the first elastomer to protect the second elastomer at elevated operating temperatures. For example, in an embodiment where the first elastomer flanks the second elastomer, the first elastomer isolates the second elastomer from the chemical attack and/or the elevated temperatures and pressures proximate to the seal 12.

An exemplary embodiment of the seal 12 includes a first elastomer portion 52 including high-temperature, 90 Shore A Durometer FKM (e.g., a type of fluorinated elastomer) and the second elastomer including low-temperature, 90 Shore A Durometer FKM. The first elastomer portion 52 formed from high-temperature, 90 Shore A Durometer FKM includes an operating range of approximately 35° F. to 350° F., and the second elastomer portion 54 formed from low-temperature, 90 Shore A Durometer FKM includes an operating range of approximately −50° F. to 250° F. Accordingly, the seal 12 includes an operating temperature range of approximately −50° F. to 350° F. Further, the seal 12 may effectively seal pressures up to and exceeding approximately 20,000 pounds per square inch (PSI). Other embodiments include various elastomers and combinations of elastomers to effectively increase or decrease the operating range of the seal 12.

Forming the seal 12 may include a variety of process to effectively interface the elastomer portions 52 and 54. In one embodiment, each of the elastomer portions 52 and 54 are extrusion molded separately and, subsequently compression molded together to provide the body 50. Accordingly, the body 50 includes a homogeneous structure that includes an interface between the elastomer portions that does not include auxiliary shear stresses (e.g., friction) between the portions. In other words, there is no boundary layer between the two materials. Another embodiment includes vulcanizing the first elastomer portion 52 and the second elastomer portion 54 to one another. For instance, in one embodiment, after each of the elastomer portions 52 and 54 are formed, they are cured in a vulcanization process. Curing the seal 12 in the vulcanization process includes exposing the elastomer portions 52 and 54 to high temperature, high pressure, and catalysts (e.g., sulfur) to cross-link the molecules of the elastomers 52 and 54. As a result, the seal 12 forms a homogeneous body 50 more resistant to chemical attack. Other embodiments of forming the seal 12 include a variety of processes. For example, one embodiment includes the use an adhesive to adhere the elastomer portions 52 and 54 to one another. Further, certain embodiments include machining the elastomers to the desired shape before or after coupling the elastomers to one another. In addition, the above discussed processes may be employed to couple (e.g., vulcanize) a plurality of elastomers to one another to form the seal 12. For example, 2, 3, 4, 5, 6, 7, 8, 9, 10, or more different elastomers may be vulcanized to form the seal 12 with an increased operating range.

In addition to the embodiments of seal 12 discussed with regard to the cross-section illustrated in FIG. 2, other embodiments include alternate configurations and geometries of the elastomer portions 52 and 54 including similar materials and forming techniques. For example, certain embodiments include more than two elastomer portions integral to the seal 12. Further, embodiments include T-seals, S-seals, Metal-End-Cap seals, face seals, and the like.

Figure 4:
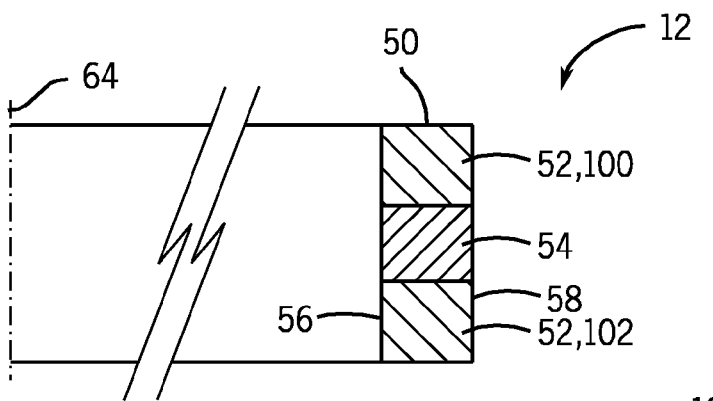
FIGS. 4-23 are partial cross-sections of alternate exemplary embodiments of the multi-elastomer annular seal of FIG. 1.

Turning now to FIG. 4, an embodiment of the seal 12 including a first elastomer portion 52 and second elastomer portion 54 extending through the body 50, is illustrated. The second elastomer portion 54 includes a single layer disposed directly between and separating a first elastomer top layer 100 and a first elastomer bottom layer 102. The second elastomer portion 54 extends adjacent to the inner surface 56 and the outer surface 58 of the seal 12. In other words, the second elastomer portion 54 includes a layer of elastomer that is sandwiched between the first elastomer portions 52. "Sandwiched" refers to the disposition of the first elastomer portion 52 about at least two sides of the second elastomer portion 52. In one embodiment, the first elastomer portions 52 include a hard elastomer, and the second elastomer portion 54 includes a soft elastomer. In other embodiments, each portion of the seal 12 includes a different material and/or properties, e.g., differing hardness/stiffness/Durometer. For example, in one embodiment, the first elastomer top portion 100 includes a hard elastomer, the second elastomer portion 54 includes a soft elastomer, and the first elastomer bottom portion 102 includes a super-soft elastomer.

Figure 5:
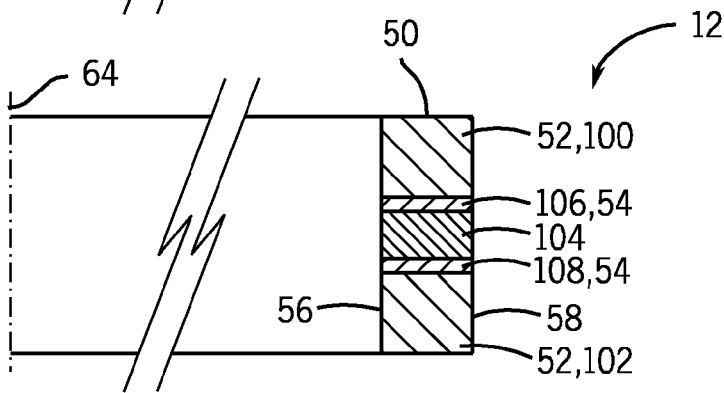

FIG. 5 illustrates an embodiment of the seal 12 including a plurality of elastomer layers in the body 50 of the seal 12. In the illustrated embodiment, the seal 12 includes a third elastomer portion 104, the second elastomer portion 54 and the first elastomer portion 52. The third elastomer portion 104 includes a single layer, the second elastomer portion 54 includes a second elastomer top layer 106 and a second elastomer bottom layer 108 disposed about the third elastomer portion 104, and the first elastomer portion 52 includes the first elastomer top layer 100 and the first elastomer bottom layer 102 disposed about the second elastomer portion 54. Each of the first elastomer portion 52, the second elastomer portion 54 and the third elastomer portion 104 extends adjacent to the inner surface 56 and the outer surface 58 of the seal 12. In other words, the seal 12 includes a plurality of elastomer layers sandwiched between outer elastomer layers.

Figure 6:
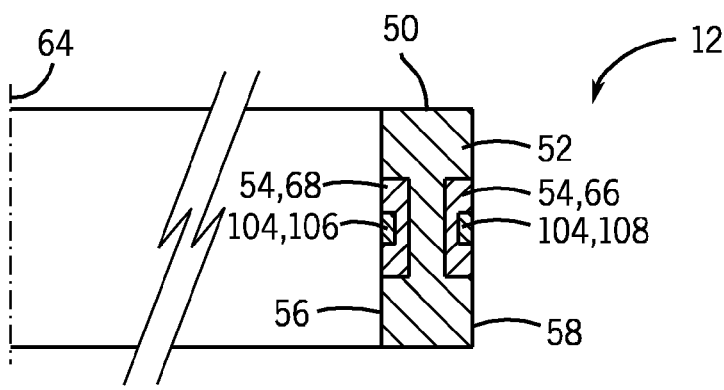

FIG. 6 illustrates an embodiment of the seal 12 including a plurality of elastomer portions nested in the body 50 of the seal 12. In the illustrated embodiment, the seal 12 includes the first elastomer portion 52, the second elastomer portion 54 and the third elastomer portion 104. The first elastomer portion 52 includes a rectangular body similar to that discussed with regard to FIG. 2. Further, the second elastomer portion 54 includes the inner and outer second elastomer portions 68 and 66 similar to those discussed with regard to FIG. 2. The third elastomer portion 104 includes an inner third elastomer 106 and an outer elastomer portion 108. As illustrated, the inner third elastomer 106 is immediately surrounded by the inner second elastomer portion 68, and the outer third elastomer portion 108 is immediately surrounded by the outer second elastomer portion 66. Further, the inner third elastomer 106 includes a face adjacent the inner face 56 of the seal 12, and the outer third elastomer 108 includes a face adjacent the outer face 58 of the seal 12. In other words, the body 50 of the seal 12 includes the first elastomer portion 52, a plurality of bands of the second elastomer portion 54 nested in the inner and outer diameter of the first elastomer portion 52, and a plurality of bands of the third elastomer portion 104 nested in each of the second elastomer portions 54. In one embodiment, the seal 12 includes only one of the inner second and third elastomer portions 68 and 106 or the outer second and third elastomer portions 66 and 108. Further, other embodiments may include any combination of the first, second and third elastomer portions 52, 54, 104.

Figure 7:
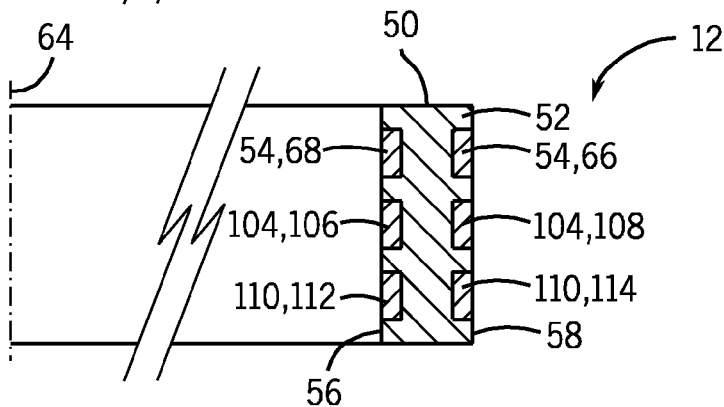

FIG. 7 illustrates an embodiment of the seal 12 including a plurality of elastomer portions offset and integral to the body 50 of the seal 12. In the illustrated embodiment, the seal 12 includes the first elastomer portion 52, the second elastomer portion 54, the third elastomer portion 104 and a fourth elastomer portion 110. Each of the second, third and fourth elastomer portions 54, 104, 110 are disposed in series along the face of the faces 56 and 58 of the seal 12. For example, the second elastomer portion 52 includes the inner and outer second elastomer 68 and 66, the third elastomer portion 104 includes the inner and outer third elastomers 106 and 108, and the fourth elastomer portion 110 includes an inner fourth elastomer 112 adjacent the inner face 56 of the seal 12, and an outer fourth elastomer 114 adjacent the outer face 58 of the seal 12. Accordingly, each of the second, third and fourth elastomers include separate rings disposed proximate to one another in the inner and outer diameters of the seal 12. In one embodiment, the second and fourth elastomer portions 54 and 110 include the same type of elastomer. For example, in one embodiment, the first elastomer portion 52 includes a hard elastomer, the second and fourth elastomer portions 54 and 110 include a soft elastomer, and the third elastomer portion 104 includes a super-soft elastomer.

Figure 8:
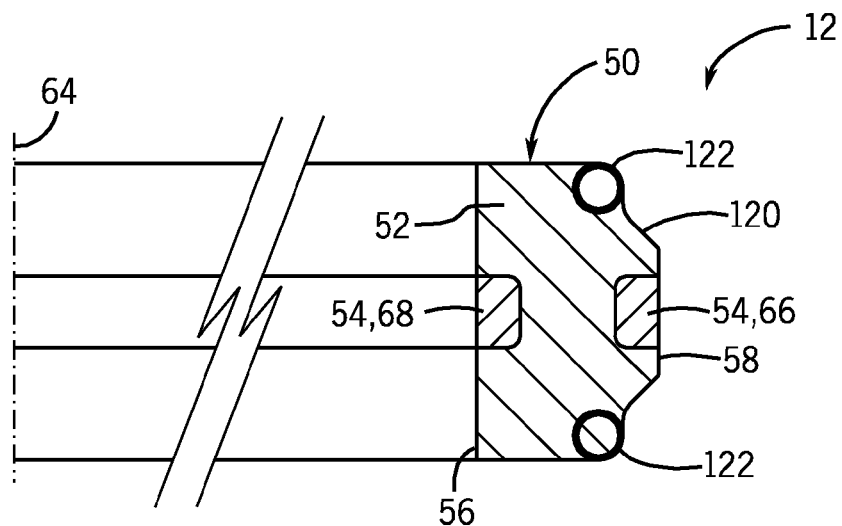
Figure 9:
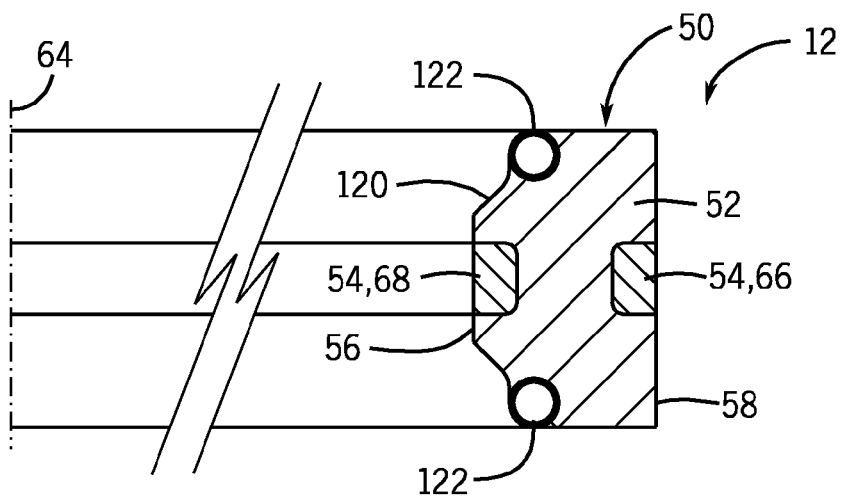

As mentioned previously, embodiments of the seal 12 include employing similar techniques in various types of seals 12. FIG. 8 illustrates an S-seal in accordance with embodiments of the present technique. The seal 12 includes the body 50 having a protrusion 120 in the outer diameter (OD), and integral anti-extrusion springs 122. Similar to the embodiments described with regard to FIG. 2, the seal 12 includes the first elastomer portion 52 flanking the second elastomer portion 54. For example, the body 50 includes the first elastomer portion 52 having a generally rectangular shape (e.g., cross-sectional profile), including the protrusion 120 extending from the outer diameter of the seal 12, and the nested second elastomer portion 54. The second elastomer portion 54 includes the outer second elastomer 66 adjacent (e.g., sharing a boundary with) the outer face 58 and the inner second elastomer 68 adjacent the inner face 56. For example, each of the outer second elastomer 66 and the inner second elastomer 68 includes a band of material that is disposed in the outer and inner diameters of the first elastomer portion 52. As will be appreciated, similar to the discussion regarding FIG. 2, the cross-section of the first elastomer portion 52 and the second elastomer portion 54 may be varied to accommodate specific applications. For example, FIG. 9 illustrates the seal 12 including an S-seal having the protrusion 120 and the anti-extrusion springs 122 disposed on the internal diameter of the seal 12.

Figure 10:
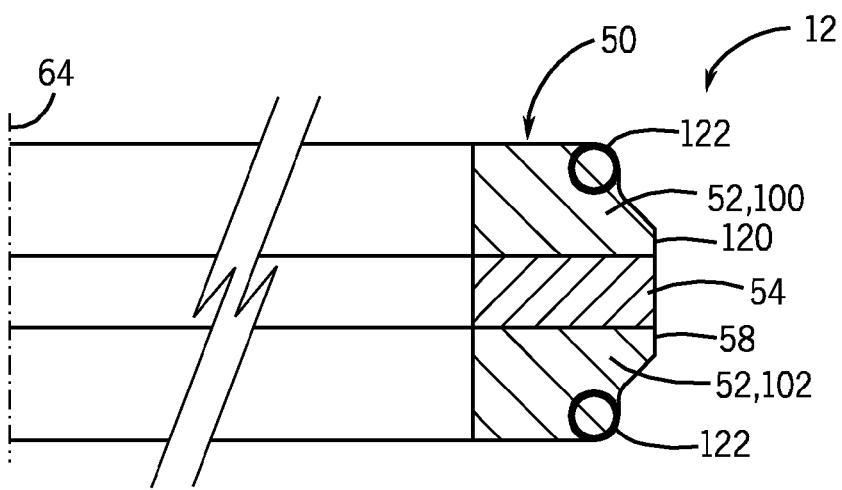

Further, embodiments including an S-seal 12 may incorporate any of the features discussed with regard to FIGS. 4-7. For example, similar to the embodiment illustrated and discussed with regard to FIG. 4, FIG. 10 illustrates an S-seal including a layer of the second elastomer 54 extending between the inner face 56 and the outer face 58. In the illustrated embodiment, the second elastomer portion 54 includes a single layer disposed directly between and separating the first elastomer top layer 100 and the first elastomer bottom layer 102, wherein the second elastomer portion 54 extends adjacent to the inner surface 56 and the outer surface 58 of the seal 12. Further, the embodiment includes the protrusion 120 in the outer diameter (OD), and integral anti-extrusion springs 122. Other embodiments include a cross-section of the seal 12 including multiple elastomer layers (see FIG. 5), multiple elastomer layers (see FIG. 6), multiple elastomers offset and integral to the body 50 (see FIG. 7), and the like.

Figure 11:
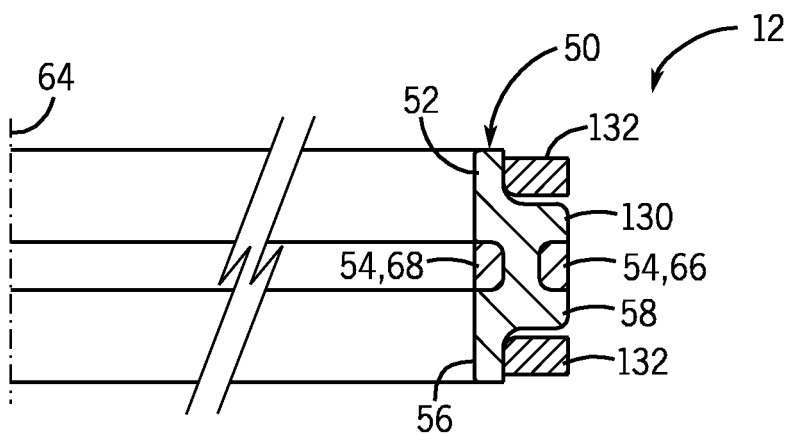
Figure 12:
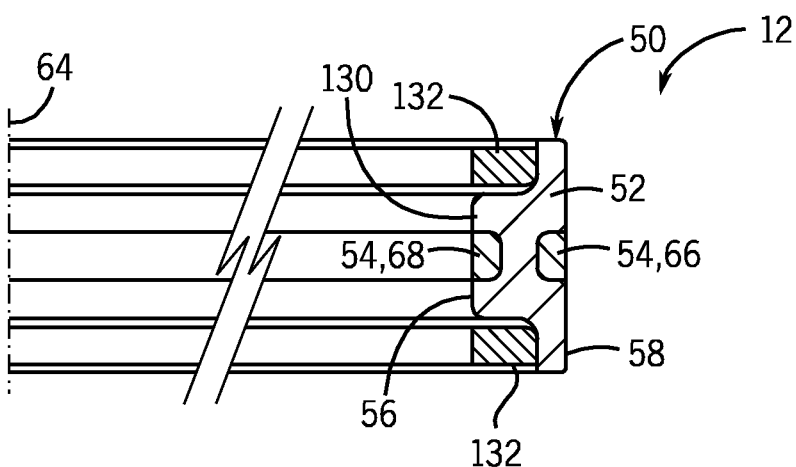

FIG. 11 illustrates a T-seal in accordance with embodiments of the present technique. The seal 12 includes a protrusion 130 in the outer diameter (OD), and extrusion rings 132 disposed integral to the protrusion 130. The extrusion rings 132 may include PEEK (polyetheretherketone), metal, or other hard plastic materials, for instance. Similar to the embodiments described with regard to FIGS. 2 and 8, the seal 12 includes the first elastomer portion 52 flanking the second elastomer portion 54. For example, the body 50 includes the first elastomer portion 52 having a generally rectangular shape (e.g., cross-sectional profile) including the protrusion 130 extending from the outer diameter of the seal 12 and the integral second elastomer portion 54. The second elastomer portion 54 includes the outer second elastomer 66 adjacent (e.g., sharing a boundary with) the outer face 58 and the inner second elastomer 68 adjacent the inner face 56. For example, each of the outer second elastomer 66 and the inner second elastomer 68 includes a band of material that is disposed in the outer and inner diameters of the first elastomer portion 52. As will be appreciated, similar to the discussion regarding FIGS. 2 and 8, the cross-section of the first elastomer portion 52 and the second elastomer portion 54 can be varied to accommodate specific applications. For example, FIG. 12 illustrates the seal 12 including a T-seal having the protrusion 130 and the extrusion rings 122 disposed on the internal diameter of the seal 12.

Figure 13:
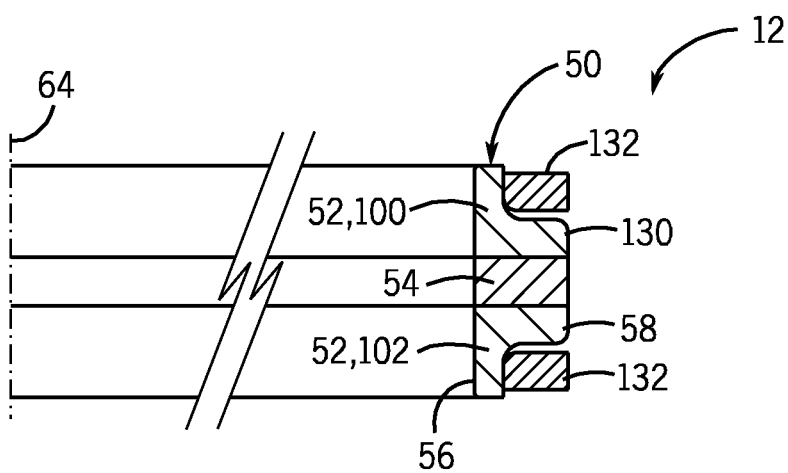

Further, embodiments of the T-seal 12 may incorporate any of the features discussed with regard to FIGS. 4-7. For example, similar to the embodiment illustrated and discussed with regard to FIGS. 4 and 10, FIG. 13 illustrates a T-seal including a layer of the second elastomer 54 extending between the inner face 56 and the outer face 58. In the illustrated embodiment, the second elastomer portion 54 includes a single layer disposed directly between and separating the first elastomer top layer 100 and the first elastomer bottom layer 102, wherein the second elastomer portion 54 extends adjacent to the inner surface 56 and the outer surface 58 of the seal 12. Further, the embodiment includes the protrusion 130 in the outer diameter (OD), and extrusion rings 132. Other embodiments may include a cross-section of the seal 12 including multiple elastomer layers (see FIG. 5), multiple elastomer layers (see FIG. 6), multiple elastomers offset and integral to the body 50 (see FIG. 7), and the like.

Figure 14:
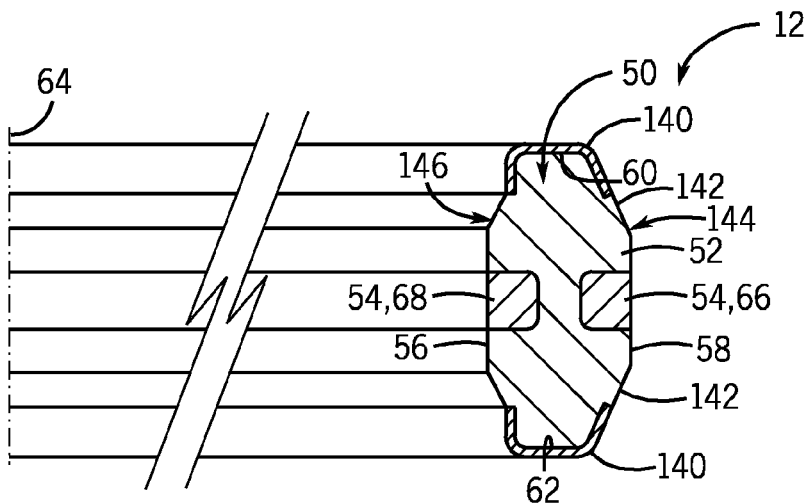

FIG. 14 illustrates a Metal-End-Cap seal in accordance with embodiments of the present technique. The seal 12 includes metal caps 140 disposed on the top and bottom faces 60 and 62 of the seal 12. Further, the seal 12 includes a cross-section having chamfers 142 defining a first protrusion 144 including the outer face 58. The internal diameter includes a second protrusion 146 that defines the inner face 56. Similar to the embodiments described with regard to FIGS. 2, 8 and 11, the seal 12 includes the first elastomer portion 52 flanking the second elastomer portion 54. For example, the body 50 includes the first elastomer portion 52 having a generally rectangular shape (e.g., cross-sectional profile) including the protrusions 144 and 146 and the nested second elastomer portion 54. The second elastomer portion 54 includes the outer second elastomer 66 integral to the first protrusion 144 and adjacent (e.g., sharing a boundary with) the outer face 58, and the inner second elastomer 68 integral to the second protrusion 146 and adjacent the inner face 56. For example, each of the outer second elastomer 66 and the inner second elastomer 68 includes a band of material that is disposed in the outer and inner diameters of the first elastomer portion 52. As will be appreciated, similar to the discussion regarding FIGS. 2, 8 and 11, the cross-section of the first elastomer portion 52 and the second elastomer portion 54 may be varied to accommodate specific applications.

Figure 15:
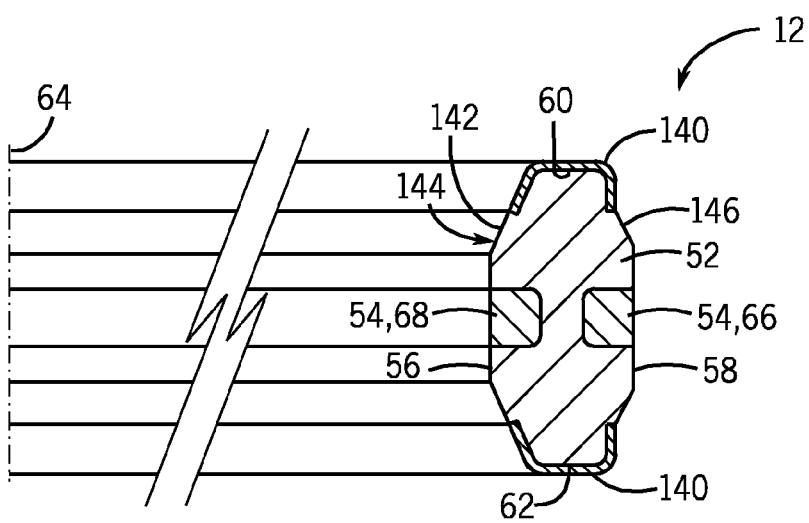
Figure 16:
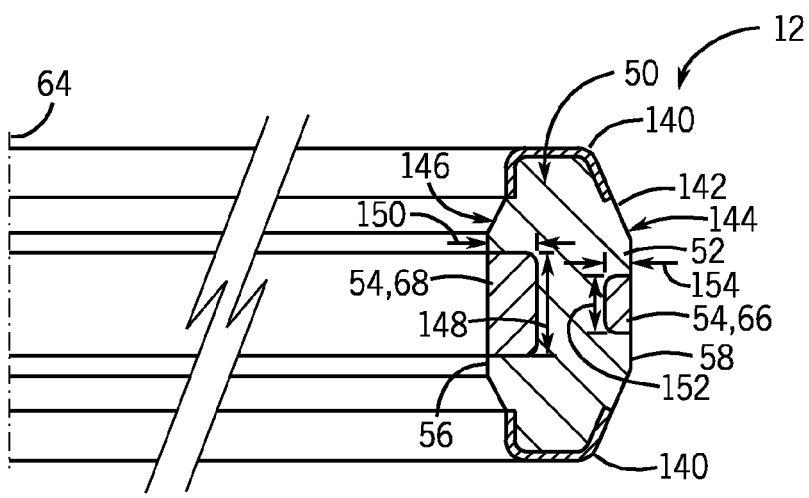
Figure 17:
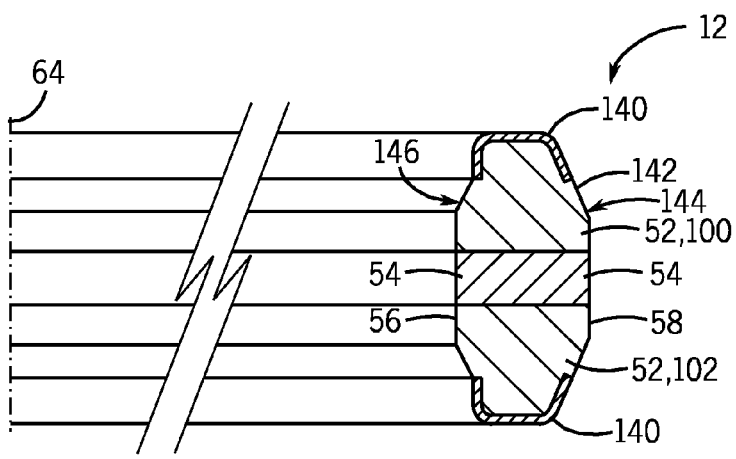

FIG. 15 illustrates the Metal-End-Cap seal 12 having the first protrusion 144 and the chamfers 142 disposed on the internal diameter of the seal 12. Further, the shape and location of each of the first and second sealing portions 52 and 54 may be varied. For instance, the second elastomer portions 54 may not be disposed symmetrically about the body 50. In one embodiment, the outer second elastomer 66 is offset from the inner second elastomer 68 in a direction generally parallel to the longitudinal axis 64. Further, the size and shape of each of the outer second elastomer 66 and the inner second elastomer 68 may be varied. For example, FIG. 16 illustrates an embodiment of the Metal-End-Cap seal 12, wherein the height 148 and width 150 of the inner second elastomer 68 is greater than the height 152 and width 154 of the outer second elastomer 66.

Further, the Metal-End-Cap seal 12 may incorporate any of the embodiments of the seal 12 discussed with regard to FIGS. 4-7. For example, similar to the embodiments illustrated and discussed with regard to FIGS. 4, 10 and 13, FIG. 17 illustrates the Metal-End-Cap seal 12 including a layer of the second elastomer 54 extending between the inner face 56 and the outer face 58. In the illustrated embodiment, the second elastomer portion 54 includes a single layer disposed directly between and separating the first elastomer top layer 100 and the first elastomer bottom layer 102, wherein the second elastomer portion 54 extends adjacent to the inner surface 56 and the outer surface 58 of the seal 12.

Figure 18:
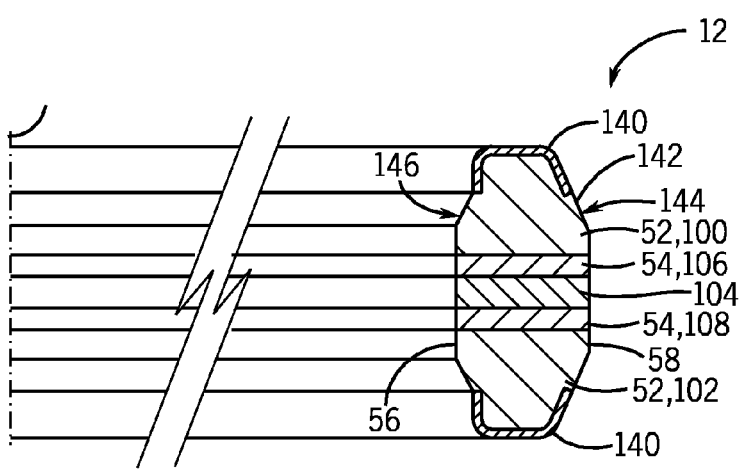

Other embodiments include a cross-section of the seal 12 including multiple elastomer layers. For example, similar to the embodiment of the seal illustrated in FIG. 5, FIG. 18 illustrates an embodiment of the Metal-End-Cap seal 12 including a plurality of elastomer layers in the body 50 of the seal 12. In the illustrated embodiment, the seal 12 includes the third elastomer portion 104, the second elastomer portion 54 and the first elastomer portion 52. The third elastomer portion 104 includes a single layer, the second elastomer portion 54 includes the second elastomer top layer 106 and the second elastomer bottom layer 108 disposed about the third elastomer portion 104, and the first elastomer portion 52 includes the first elastomer top layer 100 and the first elastomer bottom layer 102 disposed about the second elastomer portion 54. Each of the first elastomer portion 52, the second elastomer portion 54 and the third elastomer portion 104 extends adjacent to the inner surface 56 and the outer surface 58 of the seal 12. In other words, the seal 12 includes a plurality of elastomer layers sandwiched between outer elastomer layers.

Figure 19:
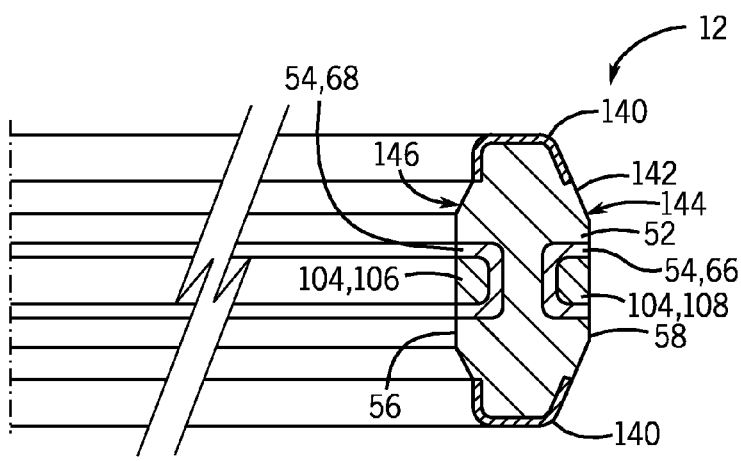

FIG. 19 illustrates an embodiment of the Metal-End-Cap seal 12 including multiple nested elastomer layers similar to the embodiment of the cross-section illustrated in FIG. 6. In the illustrated embodiment, the seal 12 includes the first elastomer portion 52, the second elastomer portion 54 and the third elastomer portion 104. The first elastomer portion 52 includes the rectangular body 50, and the second elastomer portion 54 includes the inner and outer second elastomer portions 66 and 68. The third elastomer portion 104 includes the inner third elastomer 106 and the outer elastomer portion 108. As illustrated, the inner third elastomer 106 is immediately surrounded by the inner second elastomer portion 68, and the outer third elastomer portion 108 is immediately surrounded by the outer second elastomer portion 66. Further, the inner third elastomer 106 includes a face adjacent the inner face 56 of the seal 12, and the outer third elastomer portion 108 includes a face adjacent the outer face 58 of the seal 12. Another embodiment of the Metal-End-Cap seal 12 may includes multiple elastomers offset and integral to the body 50 (see FIG. 7), and the like.

Figure 20:
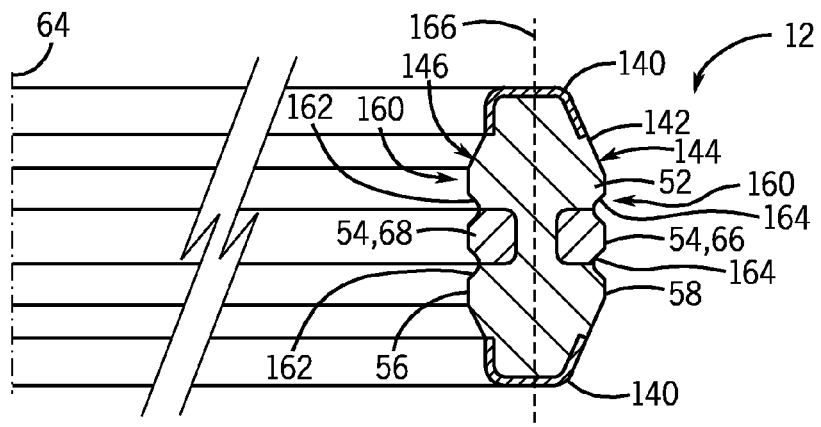

In addition, to the previously discussed features, the seal 12 may incorporate additional features to improve the seal. For example, embodiments of the seal 12 include a cross-section including a plurality of indentations. Indentations in the cross-section translate into grooves that extend about the internal and external diameter of the seal (e.g., faces 56 and 58). The grooves effectively create ridges that provide areas of increased contact stress to maintain a fluid seal between the seal 12 and the internal and external bodies 14 and 16. For instance, FIG. 20 illustrates an embodiment of the seal 12 including a plurality of indentations 160. The indentations include inner diameter indentations 162 and outer diameter indentation 164. Further, the indentations 160 are disposed in a plurality of the elastomers. For instance, the indentations 160 may include annular grooves in the first elastomer portion 52 and the second elastomer portion 54. In the illustrated embodiment of FIG. 20, the inner and outer indentations 162 and 162 are generally symmetrical about an axis 160 running down the center of the cross-section of the seal 12. In other words, the geometries of the indentations 160 are identical on the inner face 56 and the outer face 58.

Figure 21:
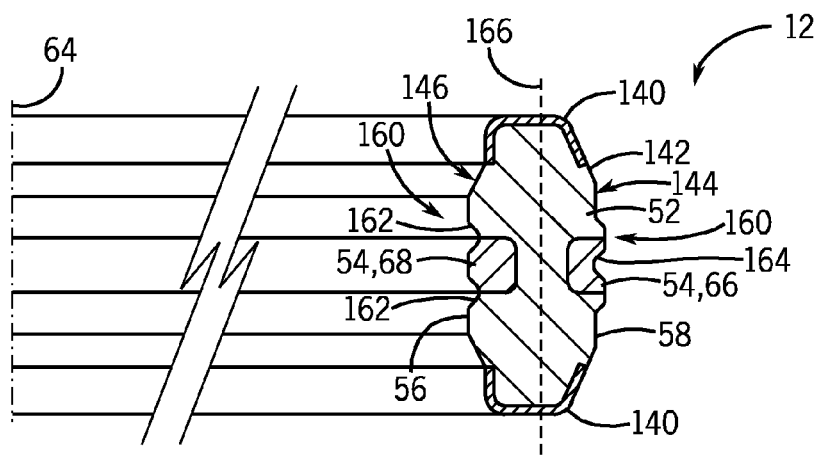

Other embodiments of the seal 12 include asymmetrical profiles on the internal diameter and the external diameter of the seal 12. FIG. 21 illustrates an embodiment including a Metal-End-Cap seal 12 having an asymmetrical profile on the inner face 56 and the outer face 58. For example, the illustrated embodiment includes two indentations 162 on the inner face 56 of the seal 12, and a single indentation 164 on the outer face 58 of the seal 12. In other words, the seal 12 cross-section includes a first geometry on the internal diameter and a second geometry on the external diameter that is different from the first geometry. Similar features may be incorporated into a variety of seals. For example, embodiments include the asymmetric or symmetric profile employed in a T-seal, an S-seal, and the like.

Figure 22:
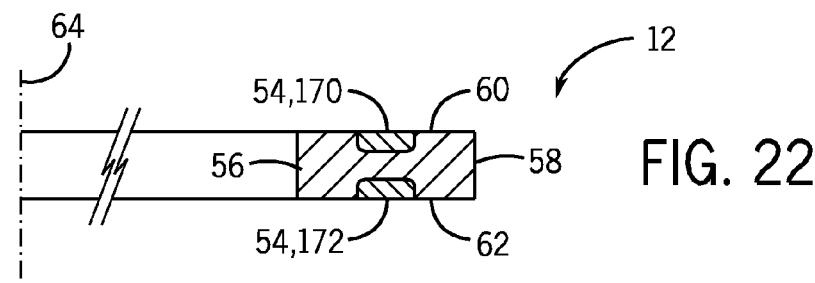

Although the above discussion focuses primarily on annular (e.g., radial) seals 12, similar techniques may be employed in the design and use of face seals. Face seals generally include seals 12 that provide a fluid seal between two generally flat surfaces. For example, FIG. 22 illustrates an embodiment of a face seal 12 in accordance with techniques of the present technique. The seal 12 includes the body 50, the first elastomer portion 52, the second elastomer portion 54, the inner face 56, the outer face 58, the top face 60 and the bottom face 62. In operation, the top face 60 is mated to a first body and the bottom face 62 is mated to a second body to provide a fluid seal between the first and second bodies. Accordingly, embodiments include the addition of sealing features conducive to sealing via the top and bottom faces 60 and 62. For example, as illustrated in FIG. 22, the second elastomer portion 54 includes a top second elastomer 170 adjacent the top face 60 and a bottom second elastomer 172 adjacent bottom face 62. Thus, the first elastomer portion 52 flanks the second elastomer portion 54 in a similar manner to that discussed with regard to FIG. 2.

Figure 23:
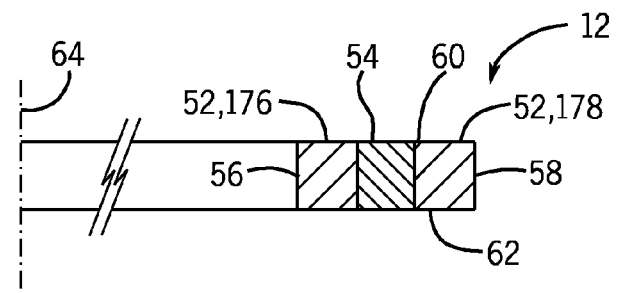

In another embodiment, the second elastomer portion includes a single layer passing through the cross-section of the seal 12. For example, FIG. 23 includes an embodiment similar to those illustrated and discussed with regard to FIGS. 4, 10, 13 and 17. As illustrated in FIG. 23, the seal 12 includes a first elastomer portion 52, and a second elastomer portion 54. The second elastomer portion 54 includes a single layer disposed between a first elastomer inner layer 176 and a first elastomer outer layer 178. The second elastomer portion 54 extends adjacent to the top face 60 and the bottom face 62 of the seal 12. Other embodiments include the face seal 12 having cross-sections similar to those discussed with regard to FIGS. 4-21.

Each of the above discussed embodiments of the seal 12 may include any combination of elastomers and cross-sections conducive to providing a fluid seal. For example, each separate portion may include an elastomer having a different hardness, stiffness or glass transition temperature. Further, embodiments may include combinations of the embodied cross-sections. For example, an embodiment includes a cross-section including a profile similar to FIG. 2 at the inner face 56, and a cross-section including a profile similar to FIG. 6 on the outer face 58.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A system, comprising:
   a fluid seal, comprising:
      an inner annular seal interface extending circumferentially about a central axis of the fluid seal and configured to seal against a first annular surface of a first annular body;
      an outer annular seal interface extending circumferentially about the central axis of the fluid seal and configured to seal against a second annular surface of a second annular body, wherein the inner and outer annular seal interfaces face radially away from one another relative to the central axis, the inner and outer annular seal interfaces comprise respective first and second cylindrical seal interfaces disposed axially along the fluid seal, and the first and second cylindrical seal interfaces are pre-formed prior to installation of the fluid seal;

an annular body elastomer portion extending circumferentially along the first and second cylindrical seal interfaces, wherein the annular body elastomer portion comprises a body rubber material; and a first annular elastomer portion extending circumferentially along the first cylindrical seal interface, wherein the first annular elastomer portion is recessed within the annular body elastomer portion, the first annular elastomer portion comprises a first rubber material, the annular body elastomer portion extends to the first cylindrical seal interface on axially opposite sides of the first annular elastomer portion, and the annular body elastomer portion is configured to seal against the first annular surface of the first annular body on the axially opposite sides of the first annular elastomer portion;

a first pair of annular indentions spaced axially apart from one another and recessed radially into the first cylindrical seal interface at a first pair of annular intersections between the annular body portion and the first annular elastomer portion on the axially opposite sides of the first annular elastomer portion;

a second annular elastomer portion extending circumferentially along the second cylindrical seal interface, wherein the second annular elastomer portion is recessed within the annular body elastomer portion radially opposite from the first annular elastomer portion at an axial position between opposite first and second axial ends of the fluid seal, the second annular elastomer portion comprises a second rubber material, the body rubber material is harder than the first and second rubber materials, the annular body elastomer portion extends to the second cylindrical seal interface on axially opposite sides of the second annular elastomer portion, and the annular body elastomer portion is configured to seal against the second annular surface of the second annular body on the axially opposite sides of the second annular elastomer portion, wherein the body, first, and second rubber materials directly contact one another and are vulcanized together to define vulcanized bonds with cross-links directly between the body, first, and second rubber materials; and a second pair of annular indentions spaced axially apart from one another and recessed radially into the second cylindrical seal interface at a second pair of annular intersections between the annular body portion and the second annular elastomer portion on the axially opposite sides of the second annular elastomer portion.

2. The system of claim 1, wherein the annular body elastomer portion is effective to seal at a temperature above an effective sealing temperature of the first and second annular elastomer portions.

3. The system of claim 1, wherein the annular body elastomer portion has a glass transition temperature that is greater than the first and second annular elastomer portions.

4. The system of claim 1, wherein the annular body elastomer portion is configured to seal against the first annular surface of the first annular body on the axially opposite sides of the first annular elastomer portion to protect the first annular elastomer portion against explosive decompression, and the annular body elastomer portion is configured to seal against the second annular surface of the second annular body on the axially opposite sides of the second annular elastomer portion to protect the second annular elastomer portion against explosive decompression.

5. The system of claim 1, comprising a third annular elastomer portion extending circumferentially along the first cylindrical seal interface and a fourth annular elastomer portion extending circumferentially along the second cylindrical seal interface, wherein the third and fourth annular elastomer portions are recessed within the annular body elastomer portion, and the first and second annular elastomer portions are recessed within the respective third and fourth annular elastomer portions.

6. The system of claim 1, wherein the body rubber material comprises hydrogenated nitrile butadiene rubber (HNBR) and the first and second rubber materials comprise nitrile rubber (NBR).

7. The system of claim 1, wherein the annular body elastomer portion comprises a first hardness of greater than about 90 Shore A Durometer, and the first and second annular elastomer portions comprises a second hardness of less than about 80 Shore A Durometer.

8. The system of claim 1, wherein the annular body elastomer portion has a greater resistance to chemical attack than the first and second annular elastomer portions.

9. The system of claim 1, comprising a first metal end cap disposed on the first axial end of the fluid seal, and a second metal end cap disposed on the second axial end of the fluid seal.

10. The system of claim 1, wherein at least one of the first or second cylindrical seal interfaces is disposed along at least half of an axial length of the fluid seal.

11. The system of claim 1, wherein the first and second cylindrical seal interfaces extend axially along an intermediate portion of the fluid seal between the opposite first and second axial ends.

12. The system of claim 11, wherein the first cylindrical seal interface is disposed on a first annular protrusion on the inner annular seal interface, and the second cylindrical seal interface is disposed on a second annular protrusion on the outer annular seal interface.

13. The system of claim 1, comprising third and fourth annular elastomer portions, wherein the first and third annular elastomer portions are recessed radially into the annular body elastomer portion and extend to the first cylindrical seal interface, and the second and fourth annular elastomer portions are recessed radially into the annular body elastomer portion and extend to the second cylindrical seal interface.

14. The system of claim 1, comprising the first and second annular bodies of a mineral extraction system, wherein the fluid seal is sealed against the first and second annular surfaces of the respective first and second annular bodies.

15. The system of claim 1, wherein the vulcanized bonds extend directly to the first and second cylindrical seal interfaces.

16. The system of claim 1, wherein the vulcanized bonds comprise at least one catalyst to cross-link molecules of the body, first, and second rubber materials.

17. The system of claim 16, wherein the at least one catalyst comprises sulfur.

18. A system, comprising:
a fluid seal, comprising:

an inner annular seal interface extending circumferentially about a central axis of the fluid seal and configured to seal against a first annular surface of a first annular body;

an outer annular seal interface extending circumferentially about the central axis of the fluid seal and configured to seal against a second annular surface of a second annular body, wherein the inner and outer annular seal interfaces face radially away from one another relative to the central axis, the inner and outer annular seal interfaces comprise respective first and second cylindrical seal interfaces disposed axially along the fluid seal, and the first and second cylindrical seal interfaces are pre-formed prior to installation of the fluid seal;

an annular body elastomer portion extending circumferentially along the first and second cylindrical seal interfaces, wherein the annular body elastomer portion comprises a body rubber material; and a first annular elastomer portion extending circumferentially along the first cylindrical seal interface, wherein the first annular elastomer portion is recessed within the annular body elastomer portion, the first annular elastomer portion comprises a first rubber material, the annular body elastomer portion extends to the first cylindrical seal interface on axially opposite sides of the first annular elastomer portion, and the annular body elastomer portion is configured to seal against the first annular surface of the first annular body on the axially opposite sides of the first annular elastomer portion;

a first pair of annular indentions spaced axially apart from one another and recessed radially into the first cylindrical seal interface at a first pair of annular intersections between the annular body portion and the first annular elastomer portion on the axially opposite sides of the first annular elastomer portion;

a second annular elastomer portion extending circumferentially along the second cylindrical seal interface, wherein the second annular elastomer portion is recessed within the annular body elastomer portion radially opposite from the first annular elastomer portion at an axial position between opposite first and second axial ends of the fluid seal, the second annular elastomer portion comprises a second rubber material, the body rubber material is harder than the first and second rubber materials, the annular body elastomer portion extends to the second cylindrical seal interface on axially opposite sides of the second annular elastomer portion, and the annular body elastomer portion is configured to seal against the second annular surface of the second annular body on the axially opposite sides of the second annular elastomer portion, wherein the body, first, and second rubber materials directly contact one another and are vulcanized together to define vulcanized bonds with cross-links directly between the body, first, and second rubber materials;

a second pair of annular indentions spaced axially apart from one another and recessed radially into the second cylindrical seal interface at a second pair of annular intersections between the annular body portion and the second annular elastomer portion on the axially opposite sides of the second annular elastomer portion;

a first metal end cap coupled to the first axial end of the fluid seal; and a second metal end cap coupled to the second axial end of the fluid seal.

19. The system of claim 18, wherein each indention of the first pair of annular indentions and the second pair of annular indentions comprises a C-shaped profile extending circumferentially about the central axis.

20. The system of claim 18, wherein the first and second cylindrical seal interfaces extend axially along an intermediate portion of the fluid seal between the opposite first and second axial ends.

21. The system of claim 20, wherein the first cylindrical seal interface is disposed on a first annular protrusion on the inner annular seal interface axially between a first pair of opposite annular tapered portions, and the second cylindrical seal interface is disposed on a second annular protrusion on the outer annular seal interface axially between a second pair of opposite annular tapered portions.

22. A system, comprising:
a fluid seal, comprising:
an inner annular seal interface extending circumferentially about a central axis of the fluid seal and configured to seal against a first annular surface of a first annular body;

an outer annular seal interface extending circumferentially about the central axis of the fluid seal and configured to seal against a second annular surface of a second annular body, wherein the inner and outer annular seal interfaces face radially away from one another relative to the central axis, the inner and outer annular seal interfaces comprise respective first and second cylindrical seal interfaces disposed axially along the fluid seal, and the first and second cylindrical seal interfaces are pre-formed prior to installation of the fluid seal;

an annular body elastomer portion extending circumferentially along the first and second cylindrical seal interfaces, wherein the annular body elastomer portion comprises a body rubber material; and a first annular elastomer portion extending circumferentially along the first cylindrical seal interface, wherein the first annular elastomer portion is recessed within the annular body elastomer portion, the first annular elastomer portion comprises a first rubber material, the annular body elastomer portion extends to the first cylindrical seal interface on axially opposite sides of the first annular elastomer portion, and the annular body elastomer portion is configured to seal against the first annular surface of the first annular body on the axially opposite sides of the first annular elastomer portion;

a first pair of annular indentions spaced axially apart from one another and recessed radially into the first cylindrical seal interface at a first pair of annular intersections between the annular body portion and the first annular elastomer portion on the axially opposite sides of the first annular elastomer portion;

a second annular elastomer portion extending circumferentially along the second cylindrical seal interface, wherein the second annular elastomer portion is recessed within the annular body elastomer portion radially opposite from the first annular elastomer portion at an axial position between opposite first and second axial ends of the fluid seal, the second annular elastomer portion comprises a second rubber material, the body rubber material is harder than the first and second rubber materials, the annular body elastomer portion extends to the second cylindrical seal interface on axially opposite sides of the second annular elastomer portion, and the annular body elastomer portion is configured to seal against the second annular surface of the second annular body on the axially opposite sides of the second annular elastomer portion, wherein the body, first, and second rubber materials directly contact one another and are vulcanized together to define vulcanized bonds with cross-links directly between the body, first, and second rubber materials; and a second pair of annular indentions spaced axially apart from one another and recessed radially into the second cylindrical seal interface at a second pair of annular intersections between the annular body portion and the second annular elastomer portion on the axially opposite sides of the second annular elastomer portion;

wherein each indention of the first pair of annular indentions and the second pair of annular indentions comprises a C-shaped profile extending circumferentially about the central axis.

23. The system of claim 22, wherein at least one of the first or second cylindrical seal interfaces is disposed along at least half of an axial length of the fluid seal.

24. The system of claim 22, wherein the first and second cylindrical seal interfaces extend axially along an intermediate portion of the fluid seal between the opposite first and second axial ends.

25. The system of claim 24, wherein the first cylindrical seal interface is disposed on a first annular protrusion on the inner annular seal interface, and the second cylindrical seal interface is disposed on a second annular protrusion on the outer annular seal interface.

* * * * *